United States Patent [19]

Islip

[11] 4,444,261

[45] Apr. 24, 1984

[54] HIGH SWEEP EFFICIENCY STEAM DRIVE OIL RECOVERY METHOD

[75] Inventor: Philip N. Islip, Plano, Tex.

[73] Assignee: Mobil Oil Corporation, New York, N.Y.

[21] Appl. No.: 430,181

[22] Filed: Sep. 30, 1982

[51] Int. Cl.³ .................... E21B 33/138; E21B 43/24
[52] U.S. Cl. ................................ 166/272; 166/273; 166/288; 166/294
[58] Field of Search ............... 166/272, 288, 294, 261, 166/273

[56] References Cited

U.S. PATENT DOCUMENTS

| | | | |
|---|---|---|---|
| 2,779,415 | 1/1957 | Howard | 166/288 X |
| 3,198,249 | 8/1965 | Willman | 166/288 X |
| 3,412,793 | 11/1968 | Needham | 166/272 X |
| 3,669,188 | 6/1972 | Coles et al. | 166/272 X |
| 3,993,133 | 11/1976 | Clampitt | 166/272 |
| 4,064,942 | 12/1977 | Prats | 166/272 X |
| 4,074,757 | 2/1978 | Felber et al. | 166/272 X |
| 4,086,964 | 5/1978 | Dilgren et al. | 166/272 |
| 4,175,618 | 11/1979 | Wu et al. | 166/272 X |

FOREIGN PATENT DOCUMENTS 1004977  2/1977  Canada .................. 166/272

*Primary Examiner*—Stephen J. Novosad
*Attorney, Agent, or Firm*—Alexander J. McKillop; Michael G. Gilman; Lawrence O. Miller

[57] ABSTRACT

The sweep efficiency of a steam drive process is improved and steam override reduced significantly if steam is injected into a formation until channeling has begun, after which steam injection is terminated and a slug of a thermally stable diverting fluid comprising a high molecular weight hydrocarbon within the temperature range of 500° to 1000° F. is injected into the steam-swept zone and allowed to cool until the diverting fluid has increased in viscosity to a value greater than the in place oil thereby creating a highly immobile slug in the steam-swept zone. Thereafter, injection of steam is continued and oil recovered. Multiple cycles of steam injection and rejection of slugs of diverting fluid may be repeated to improve sweep efficiency depending upon the vertical thickness of the formation.

12 Claims, 3 Drawing Figures

HIGH SWEEP EFFICIENCY STEAM DRIVE OIL RECOVERY METHOD

FIELD OF THE INVENTION

The invention relates to a steam drive oil recovery process wherein the vertical and horizontal conformance is improved by alternately injecting steam and a heated thermally stable, diverting fluid comprising a high molecular weight hydrocarbon into the steam-swept zone, allowing the diverting fluid to cool sufficiently to increase its viscosity above that of the in place oil thereby effectively blocking the steam-swept zone.

BACKGROUND OF THE INVENTION

The injection of steam to recover oil from heavy oil formations is an accepted method in the industry. Past experiments and field performance have shown the improved displacement efficiency of heavy oils by reduction in viscosity of the oil by a heated displacing phase. Displacement of oil increases with increasing temperature.

Steam is considerably lighter than the oil and water present in the formation and thus, because of gravity segregation, it tends to rise to the top of the formation when vertical communication exists. Consequently, the injected steam channels through the top of the formation to the producing well overriding a major portion of the formation and contacting only a small fraction of the formation oil. Once steam override has begun, continued injection of steam into the formation will accomplish very little additional oil recovery. This behavior results in an inefficient oil recovery and low vertical sweep efficiency.

U.S. Pat. No. 4,175,618 discloses a high vertical and horizontal conformance thermal oil recovery process wherein steam is injected into a formation until channeling has begun, steam injection is terminated and an aqueous fluid is injected into the formation, which has a viscosity essentially the same as water and contains an emulsifying agent capable of forming a viscous emulsion in the portion's of the formation when override, underride or channeling has occured. After a small slug of emulsifying fluid has been injected, steam injection is resumed and as a consequence of the emulsion plug, moves into portions of the formation from which oil would not be recovered if the emulsion had not been injected. Multiple cycles of steam and emulsion injection may be applied to a formation to more completely sweep the full volume of the pattern.

The following U.S. patents describe processes for forming viscous emulsions on the surface of the earth and injecting them into formations for the purpose of decreasing the permeability of zones in the formations which are more permeable than other portions of the formation. U.S. Pat. No. 3,149,669; U.S. Pat. No. Re. 27,198 (original U.S. Pat. No. 3,443,636); U.S. Pat. Nos. 3,502,146 (1970); and 3,866,680 (1975). U.S. Pat. Nos. 3,946,812; 3,888,308; 3,508,612; 3,500,923; 3,827,497; 3,811,504 and 3,890,239 relate to the use of sulfated ethoxylated surfactants in oil displacing fluids. U.S. Pat. Nos. 3,792,731; 3,799,264; 3,811,504 and 3,811,505 describe oil recovery processes and fluids employing non-ionic surfactants. U.S. Pat. Nos. 3,827,497 and 3,890,239 disclose the use of a mixture of organic sulfonate and a sulfated or sulfonated, ethoxylated alcohol.

Viscous polymer fluids are not effective for treating steam-swept zones in connection with thermal oil recovery methods because such polymers are not suitable at the temperatures which are encountered in the steam-swept zone. The viscosity developed by polymers in fluids prepared on the surface of the earth is lost quickly in the subterranean formation after it had been exposed to the elevated temperatures of the steam swept zone. Viscous emulsions are usually unsuccessful in treating permeability problems created in viscous oil formations by steam flooding because the emulsions are difficult to inject into the formation since their viscosity is highest at the time of injection, and so the effectiveness is mostly limited to the portions of the formation very near the wellbore.

The present invention provides a method for increasing the sweep efficiency of a steam drive oil recovery method utilizing a thermally stable diverting fluid.

SUMMARY

The process of my invention involves improving the sweep efficiency and thermal efficiency of a steam drive oil recovery process utilizing a thermally stable high viscosity diverting fluid comprising high molecular weight hydrocarbons. The process of my invention involves a subterranean, viscous oil-containing formation penetrated by at least one injection well and at least one spaced-apart production well. Both wells are completed to be in fluid communication with a substantial portion of the formation. Initially, steam is injected into the formation via the injection well for a predetermined period of time and fluids including oil are recovered from the formation via the the production well. Steam flooding may be continued until steam breakthrough occurs at the production well or until it is uneconomical to continue injecting steam due to steam override which results in a steam-swept zone in the upper portion of the formation. Thereafter, a predetermined amount of a diverting fluid comprising a thermally stable high molecular weight hydrocarbon is injected in the steam-swept zone via the injection well at a temperature within the range of 500° to 1000° F. After the diverting fluid has been injected, it is allowed to cool in the steam-swept portion of the formation until its viscosity increases to a value greater than the viscosity of the in place oil at formation conditions thereby creating a highly immobile slug in the steam-swept zone. Thereafter, steam is injected into the formation via the injection well and fluids including oil are recovered from the formation via the production well. Multiple cycles of steam and diverting fluid injection may be applied to a formation to increase sweep efficiency. In another embodiment of the process of my invention, the diverting fluid may be reduced in viscosity for injection into the steam-swept zone by mixing it with a volatile hydrocarbon solvent that will vaporize in the steam-swept zone of the formation under the conditions of temperature and pressure existing in the formation.

DESCRIPTION OF THE PREFERRED EMBODIMENTS

The process of my invention concerns an improvement in a steam flooding type oil recovery process wherein a steam diverting fluid is injected which forms a viscous plug in the steam-swept zone of the formation, the fluid being injected periodically during the course of steam flooding, so subsequent steam injection will be forced to pass through other sections of the formation.

Figure 1:
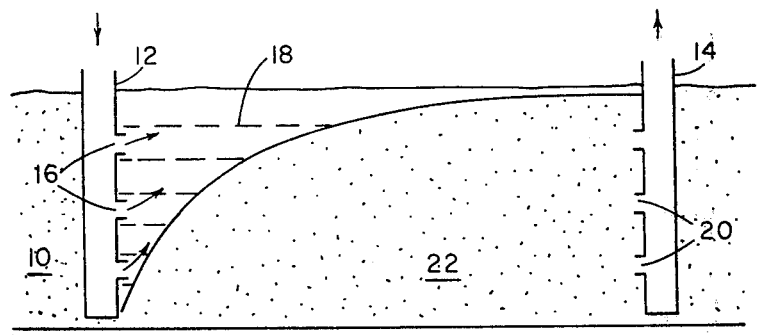
FIG. 1 illustrates how steam migrates to the top of the formation thereby creating a vertical conformance problem.

The problem of steam override for which the process of my invention represents a solution is best understood by referring to the attached drawings, in which FIG. 1 illustrates how a subterranean, viscous oil-containing formation 10 penetrated by an injection well 12 and a spaced-apart production well 14, responds to a normal steam flood. Steam is injected into injection well 12, passes through perforations 16, and then into the viscous oil-containing formation 10. Conventional practice is to perforate or establish fluid flow communications between the well and the formation throughout the full vertical thickness of the formation, both with respect to injection well 12 and production well 14. The injected steam heats the oil reducing its viscosity and displaces the mobilized oil through the formation 10 toward production well 14 from which it is recovered. Although steam is injected in the full vertical thickness of the formation, it can be seen that steam migrates both horizontally and in an upward direction as it moves through the formation between injection well 12 and production well 14. Once a portion of the formation 18 has been swept by steam passing horizontally through the formation to at least one of the perforations 20 of producing well 12, the problem of premature steam breakthrough is recognized. Since various petroleum has been removed from the portions of the pore spaces of swept zone 18, the permeability to steam is much greater in zone 18 than it is in the lower undepleted portion 22 of the formation 10. Once the high permeability swept zone 18 has been established connecting injection well 12 and projection well 14, further injection of steam into the formation will result in steam passing only through zone 18 and consequently dislacing very little additional viscous oil from that portion 22 of the formation through which very little of the steam passes causing the overall recovery efficiency from the extra recovery zone to be very low. Many additional pore volumes of steam can be injected, and the total volume of the pattern between wells 12 and 14 swept by the injected steam may be only from 10 to 15 percent of the total volume of the pattern.

Figure 2:
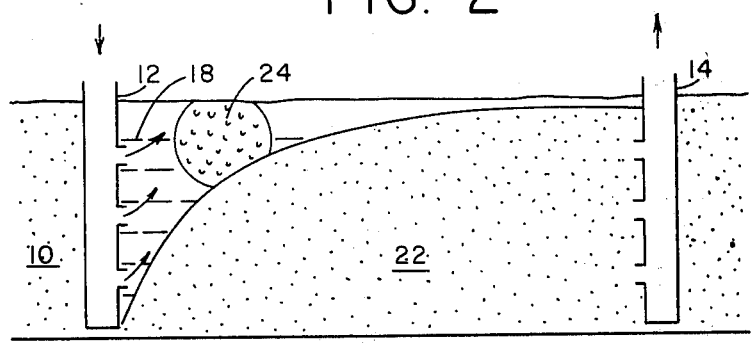
FIG. 2 illustrates injection of a high molecular weight hydrocarbon that creates a highly immobile slug in the steam-swept zone.
Figure 3:
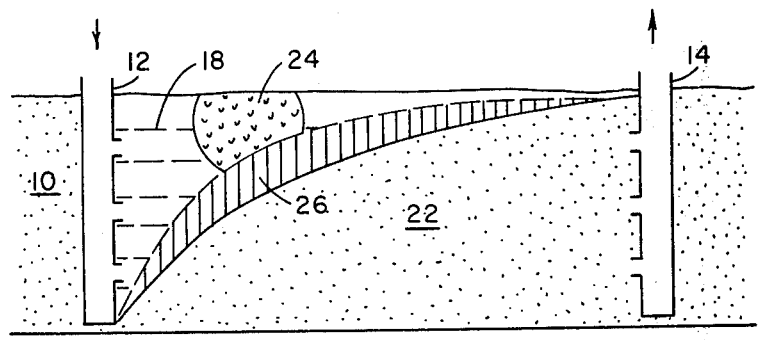
FIG. 3 illustrates how the immobile slug diverts injected steam to the lower portion of the formation

The process of my invention is illustrated by referring to FIG. 2. A predetermined amount of a diverting fluid comprising a thermally stable high molecular weight hydrocarbon is injected into the formation 10 via injection well 12 at a temperature within the range of 500° to 1000° F. The diverting fluid at this temperature has a low viscosity and will pass into the steam-swept zone 18. After a predetermined amount of diverting fluid has been injected, preferably 0.01 to 0.5 pore volume of the steam-swept portion 18 of the formation, the injected slug 24 of diverting fluid is allowed to cool for a predetermined period of time suficient to increase the viscosity of the fluid to a value greater than the viscosity of the in place oil thereby creating a highly immobile slug in the steam-swept zone 18. Thereafter, steam is injected into the formation 10 via injection well 12 and as a result of the high viscosity slug 24 of diverting fluid, the steam injected will pass through the lower portion of the original steam-swept zone displacing additional oil through the formation toward production well 14 for recovery. This phase of the process of my invention is shown in FIG. 3, and it can be seen how zone 26 represents the increased volume of the formation 10 swept by steam injected into well 12 over that swept by steam in the first steam injection step, which is shown as 18 in FIG. 1. Therefore, by confining the steam injected into the formation via the injection well to the lower portion of steam-swept zone 18, the vertical conformance and the thermal efficiency of the steam driven oil recovery process is improved. Steam injection is continued and after a predetermined period of time, steam will again pass into the portion of the original steam swept zone 18 and steam breakthrough at the production well 14 will once again be observed. At this point, as was the case at the end of step 1 illustrated by FIG. 1, further injection of steam will not recover any significant amount of additional oil.

Once steam breakthrough has again occured at production well 14, another slug of diverting fluid is injected and allowed to cool for a predetermined period of time so as to increase in viscosity creating a highly immobile slug of fluid in the previously steam-swept zone 26. Steam injection can once again be initiated to further swept oil from the formation below the second slug of diverting fluid.

The process of my invention should be continued through repetious cycles of injecting steam to a predetermined end point which may be steam breakthrough at the producing well or steam injection may be terminated prior to steam breakthrough, followed by injection of the diverting fluid comprising a thermally stable, high molecular weight hydrocarbon, allowing the diverting fluid to cool until its viscosity increases above that of the in place oil under formation conditions and once again resuming steam injection. Repetitious cycles result in sweeping a very significant percentage of the formation.

The type of high molecular weight hydrocarbons useful in the process of my invention are refinery products such as the atmospheric residue from an atmospheric crude oil distillation column having a boiling point in excess of 650° F., a vacuum residue having a boiling point of about 1050° F., a heavy vacuum gas oil having a boiling point within the range of 650°-1050° F., and a light vacuum gas oil having a boiling point within the range of 650°-850° F., or mixtures thereof.

In another embodiment of the process of my invention, the diverting fluid may be mixed with a suitable volatile hydrocarbon solvent which lowers the viscosity of the fluid sufficiently for injection into the formation. A predetermined amount of the mixture of diverting fluid and a volatile hydrocarbon solvent is injected into the steam-swept zone 18 of the formation 10 and upon entering the formation the solvent vaporizes from the injected mixture under the conditions of temperature and pressure existing in the formation thereby enabling the high viscosity diverting fluid to decrease the permeability of the steam-swept zone. Suitable solvents include gasoline, octanes, heptanes, hexanes, pentanes or any other hydrocarbons with similar boiling points. Injection of steam to a predetermined end point followed by injection of a slug of diverting fluid mixed with a solvent may be repeated for a plurality of cycles depending upon the thickness of the formation.

By the term "pore volume" as used herein, is meant that volume of the portion of the formation underlying the well pattern employed as described in greater detail in U.S. Pat. No. 3,927,716 to Burdyn et al, the disclosure of which is hereby incorporated by reference.

While the invention has been described in terms of a single injection well and a single spaced apart production well, the method according to the invention may be practiced using a variety of well patterns. Any other number of wells, which may be arranged according to any pattern, may be applied in using the present method as illustrated in U.S. Pat. No. 3,927,716 to Burdyn et al.

From the foregoing specification one skilled in the art can readily ascertain the essential features of this invention and without departing from the spirit and scope thereof can adapt it to various diverse applications. It is my intention and desire that my invention be limited only by those restrictions or limitations as are contained in he claims appended immediately hereinafter below.

What is claimed is:

1. A method for recovering oil from a subterranean, viscous oil-containing formation penetrated by at least one injection well and at least one spaced-apart production well, said wells being in fluid communication with a substantial portion of the formation, comprising:
   (a) injecting steam into the formation and producing fluids including oil from the formation via the production well for a predetermined period of time, thereby forming a steam-swept zone in the formation;
   (b) injecting a predetermined amount of a diverting fluid comprising a thermally stable high molecular weight hydrocarbon at a temperature within the range of 500° to 1000° F. into the steam-swept zone;
   (c) allowing the injected diverting fluid to cool within the formation for a predetermined period of time until it increases in viscosity to a value greater than the viscosity of the in place oil at formation conditions thereby creating a highly immobile slug in the steam-swept zone; and
   (d) thereafter injecting steam into the formation via the injection well and recovering fluids including oil from the formation via the production well.

2. A method according to claim 1 comprising the additional steps of injecting additional slugs of the diverting fluid followed by injecting steam for a plurality of cycles.

3. A method according to claim 1 wherein the volume of the diverting fluid injected into the injection well is 0.01 to 0.5 pore volume of the swept portion of the formation.

4. A method according to claim 1 wherein step (a) is continued until steam condensate appears at the production well.

5. A method according to claim 1 wherein step (a) is continued until vapor phase steam appears at the production well.

6. The method according to claim 1 wherein the thermally stable high molecular weight hydrocarbon is selected from the group consisting of atmospheric residue from an atmospheric crude oil distillation column having a boiling point in excess of 650° F., a vacuum residue having a boiling point of about 1050° F., a heavy vacuum gas oil having a boiling point within the range of 650°–1050° F., and a light vacuum gas oil having a boiling point within the range of 650°–850° F., or mixtures thereof.

7. A method for recovering oil from a subterranean, viscous oil-containing formation penetrated by at least one injection well and at least one spaced-apart production well said wells being in fluid communication with a substantial portion of the formation, comprising:
   (a) injecting steam into the formation nd producing fluids including oil from the formation via the production well for a predetermined period of time, thereby forming a steam-swept zone in the formation;
   (b) injecting a predetermined amount of a diverting fluid comprising a mixture of a high molecular weight hydrocarbon selected from the group consisting of atmospheric residue from an atmospheric crude oil distillation column having a boiling point in excess of 650° F., vacuum residue having a boiling point of about 1050° F., heavy vacuum gas oil having a boiling point within the range of 650°–1050° F., and light vacuum gas oil having a boiling point within the range of 650°–850° F., or mixtures thereof and a volatile hydrocarbon solvent, said solvent volatilizing from said mixture under the conditions of temperature and pressure existing in the formation thereby enabling the high viscosity diverting fluid to effectively block the steam-swept zone to further steam injection; and
   (c) thereafter injecting steam into the formation via the injection well and recovery fluids including oil from the formation via the production well.

8. A method according to claim 7 comprising the additional steps of injecting additional slugs of the diverting fluid followed by injecting steam for a plurality of cycles.

9. A method according to claim 7 wherein the volume of the diverting fluid injected into the injection well is 0.01 to 0.5 pore volume of the swept portion of the formation.

10. A method according to claim 7 wherein the step (a) is continued until steam condensate appears at the production well.

11. A method according to claim 7 wherein step (a) is continued until vapor phase steam appears at the production well.

12. A method according to claim 7 wherein the solvent comprises pentane, hexane, heptane, octane, and gasoline.

* * * * *

UNITED STATES PATENT AND TRADEMARK OFFICE
CERTIFICATE OF CORRECTION

PATENT NO. : 4,444,261
DATED : April 24, 1984
INVENTOR(S) : Philip N. Islip

It is certified that error appears in the above—identified patent and that said Letters Patent is hereby corrected as shown below:

Column 2, Line 1: Change "suitable" to read --stable--.

Column 6, Line 19: Change "nd" to read --and--.

Signed and Sealed this

Fourteenth Day of August 1984

[SEAL]

Attest:

GERALD J. MOSSINGHOFF

Attesting Officer

Commissioner of Patents and Trademarks